United States Patent Office 2,744,830
Patented May 8, 1956

2,744,830

SHADING COMPOSITION FOR GREENHOUSES

Richard H. F. Manske, Guelph, Ontario, Canada, assignor to United States Rubber Company, New York, N. Y., a corporation of New Jersey No Drawing. Application July 9, 1952,
Serial No. 297,993

2 Claims. (Cl. 106—84)

This invention concerns an improved light shading composition for greenhouses.

It is a practice in horticulture to apply to the windows of greenhouses a composition that will form a more or less opaque or cloudy covering on the glass, for the purpose of limiting the intensity of sunlight transmitted through the windows, and thereby protecting the plants from excessive radiation, especially in the spring and summer months. The compositions available for this purpose have not been entirely satisfactory. Thus, a good shading composition must be economical, not unduly toxic, and easy to apply. It should be susceptible of being sprayed on the windows with simple equipment and without objectionable tendency to plug the spray nozzle. For satisfactory application, it should initially be in the form of a substantially clear solution which does not become muddy after standing for a reasonable time. At the same time, it should form, upon drying, a definitely opaque film of reasonably predictable opacity. Furthermore, a satisfactory film possesses the more or less paradoxical requirement of sticking well to the glass even through heavy rains, and yet being easily removable when desired, as is usually the case with the approach of winter months and diminished sunlight. The shading composition should also be non-injurious to glass and to the structure of the greenhouse, including the paint thereon.

I have now found a new composition that provides the characteristics desired in a shading preparation. The invention is based on the discovery that an aqueous ammoniacal solution of tertiary zinc ortho-phosphate and an alkali metal silicate, is singularly adapted for shading purposes. Such a solution, when sprayed on the glass and allowed to dry, forms an essentially uniform, adherent film that is sufficiently opaque to provide the desired shading.

The composition of the invention may be prepared by mixing from about 25 to about 125 parts of tertiary zinc orthophosphate in 100 parts of ordinary hydrous ammonia (containing about 30 to 35% of ammonium hydroxide). There results a clear viscous solution, which does not contain dissolved tertiary zinc ortho-phosphate as such, but rather contains soluble, complex coordination compounds which vary in constitution according to the state of equilibrium of the mixture, and which may be represented by the general formula:

$$Zn\binom{(NH_3)_x}{(NH_4ZnPO_4)_y}.0$$

($x+y$ being equal to 4 but neither being restricted to being a whole number)

Solutions of the foregoing character are disclosed in U. S. Patent 2,530,458, of H. R. Frisch.

A peculiarity of this mixture is that it is in labile equilibrium and when the solution is dried it loses ammonia, and the complexes are converted to higher zinc polyphosphates in the form of a clear transparent glaze, much like a film that might be deposited by an organic polymer. The transparent glaze resulting from drying this ammoniacal solution has no utility as a shading composition, because it does not interfere substantially with the transmission of light. It is also observed that an opaque film can be deposited from the foregoing complex solution if a small amount of an electrolyte such as ammonium chloride is added to the solution, but such an expedient still does not result in a satisfactory shading composition, because the film does not adhere well to glass. However, I have now discovered, unexpectedly, that the addition of a small amount of an alkali metal silicate to the solution profoundly changes the character of the deposited film, and there is obtained, instead of a poorly adherent glaze, a firmly adherent film that is cloudy or turbid and highly effective for shading. Surprisingly, the addition of the small quantity of alkali metal silicate does not affect the clarity of the ammoniacal solution, but the silicate apparently causes the complexes to form unusually adherent micro-crystalline conglomerates upon drying, instead of a clear polymer.

The silicate added to the aqueous ammoniacal mixture of tertiary zinc ortho-phosphate for this purpose may be any alkali metal silicate, although sodium silicate is preferred, by reason of its low cost and ready availability. The alkali metal silicate need be present in the mixture in only very small amounts to produce the desired turbidity in the deposited film. For example, amounts of the silicate as small as about ½% by weight of the ammoniacal solution are sufficient to produce a definite cloudiness in the film. If desired, larger amounts of the alkali silicate, such as 1% or 3%, may be used to produce a more intense cloudiness in the film. However, too much of the silicate will cause the mixture to become cloudy and less adhering.

It is found that the solution including the alkali metal silicate produces a good cloudy film, and has no observable tendency to etch the glass, as would be the case if it were attempted to use a solution of the alkali metal silicate as such to form the film. A preferred composition of the invention may be prepared by adding to 100 parts of the ammoniacal solution of tertiary zinc ortho-phosphate as previously described, 100 parts of a ½% solution of an alkali metasilicate, such as sodium metasilicate. The degree of shading obtained can be varied widely by varying the amount of sodium metasilicate in the mixture, typically over a range of from 0.1 to 2%. Also, the density of the deposited film may be varied by diluting the composition with water. The undiluted solution as described will provide in one application a shading film every bit as dense as required for ordinary purposes, and when a less dense shading is required it is simply necessary to add an appropriate quantity of water to the solution. Thus, for light shading one part of the solution might be diluted with four parts of water. However, excessive dilution can cause the solution to become objectionably cloudy.

*Example*

To an aqueous solution of sodium metasilicate ($Na_2SiO_3$) containing 0.5% of the salt was added an equal weight of an aqueous ammoniacal solution of zinc phosphate containing approximately 15 parts of the zinc phosphate per 100 parts of the solution. This mixture remained essentially clear for several days. It was applied to a clean glass surface by means of a brush and the excess permitted to drain off. The film thus formed became opaque in a very short time (several minutes) and when dry it transmitted 50% of the incipient light as compared to the amount of light transmitted by another portion of the same glass.

When the above mixed solution was diluted with an equal volume of water it still remained clear for a useful length of time (several hours) and when brushed or sprayed onto glass to the point of incipient runoff an opaque film was formed on drying. This film was found to transmit 60% of the incipient light. When this glass on a greenhouse was exposed to the weather from May 1, 1951, it provided adequate shade for the growth of Cattleya orchids without a second application until the autumn by which time (October) it transmitted 80% of the incipient light. With the advent of frost and snow in November and December it was possible to remove the shading almost completely by scraping it off along with a blanket of fresh wet snow.

From the foregoing it will be apparent that the invention provides a novel shading composition having many unique advantages. The composition is inexpensive and is not unduly toxic, and is easily applied. Because the solution is essentially clear as prepared, and remains so for some time, there is little danger of clogging the nozzles of the spray equipment with which it is applied. By suitable variation of the concentration of the solution, virtually any desired degree of shading may be obtained in a single application.

The solution is not harmful to glass or to paint, and it is not seriously corrosive.

Perhaps the most surprising advantage of the present shading composition, is that the film adheres quite tenaciously to glass without rapid deterioration under heavy rains, but in the fall, with the occurrence of cold weather and frost, it tends to flake off of itself. Thus, the natural elements tend to remove the coating at the very time of the year when it is no longer needed.

If necessary, the coating is easily dissolved off at any time with the aid of very dilute acid or ammonia.

In southern climates, where substantially permanent shading is desired, the composition may be sprayed on the inside of the glass, where it will serve its purpose indefinitely.

Another advantage of this shading compound, in common with others, is that the transmitted light is scattered and danger of burning due to lenses in the glass is eliminated. Mechanical shading does not guard against burning due to imperfections in the glass.

Having thus described my invention, what I claim and desire to protect by Letters Patent is:

1. A shading composition consisting essentially of an aqueous solution of 100 parts of 30–35% hydrous ammonia, from 25 to 125 parts of tertiary zinc ortho-phosphate, and from 0.1 to 3% of an alkali metal salt of metasilicic acid, characterized by the ability to deposit a turbid film upon drying, such film being adherent to glass.

2. A shading composition as in claim 1 in which the alkali metal of the said salt of metasilicic acid is sodium.

References Cited in the file of this patent

UNITED STATES PATENTS

| | | |
|---|---|---|
| 194,916 | Jamieson | Sept. 4, 1877 |
| 729,258 | Bertrand | May 26, 1903 |
| 1,752,792 | Hageman et al. | Apr. 1, 1930 |
| 2,576,307 | Nordon | Nov. 27, 1951 |